United States Patent

Bouché

[11] Patent Number: 5,687,858
[45] Date of Patent: Nov. 18, 1997

[54] HIGH-RISE SHELVING

[75] Inventor: Norbert Bouché, Kuhardt, Germany

[73] Assignee: Bellheimer Metallwerk GmbH., Bellheim, Germany

[21] Appl. No.: 411,339

[22] Filed: Mar. 27, 1995

[30]  Foreign Application Priority Data

Apr. 19, 1994 [DE] Germany .................. 44 16 102.6

[51] Int. Cl.$^6$ .................................................. B65G 1/12
[52] U.S. Cl. .................... 211/121; 198/524; 198/536; 414/268; 414/280
[58] Field of Search .................... 211/121, 122, 211/59.2; 198/592, 524, 535, 536; 312/327, 328, 281; 414/276, 268, 280

[56]  References Cited

U.S. PATENT DOCUMENTS

| | | | |
|---|---|---|---|
| 296,600 | 4/1884 | Norwood | 414/276 |
| 375,128 | 12/1887 | Comfort | 211/121 |
| 2,616,776 | 11/1952 | Jones | 198/524 X |
| 3,105,727 | 10/1963 | Anders | 312/281 X |
| 3,805,974 | 4/1974 | Andersson et al. | 414/276 |
| 4,609,096 | 9/1986 | Doty | 198/524 X |
| 4,650,264 | 3/1987 | Dahnert | 211/121 X |

*Primary Examiner*—Leslie A. Braun
*Assistant Examiner*—Donald J. Wallace
*Attorney, Agent, or Firm*—Mark P. Stone

[57]  ABSTRACT

In high-rise shelving, in the region of a feed or removal opening (2) there is disposed a collapsible table (7), to which a shelf-rack (5) can be temporarily transferred. The table (7) assumes, in addition to the supporting function, the function of an actuating member for a switch which opens and closes a feed circuit of a drive system for rollers (4) of two roller paths, which roller paths are disposed in the region of the base of the feed or removal opening (2).

2 Claims, 3 Drawing Sheets

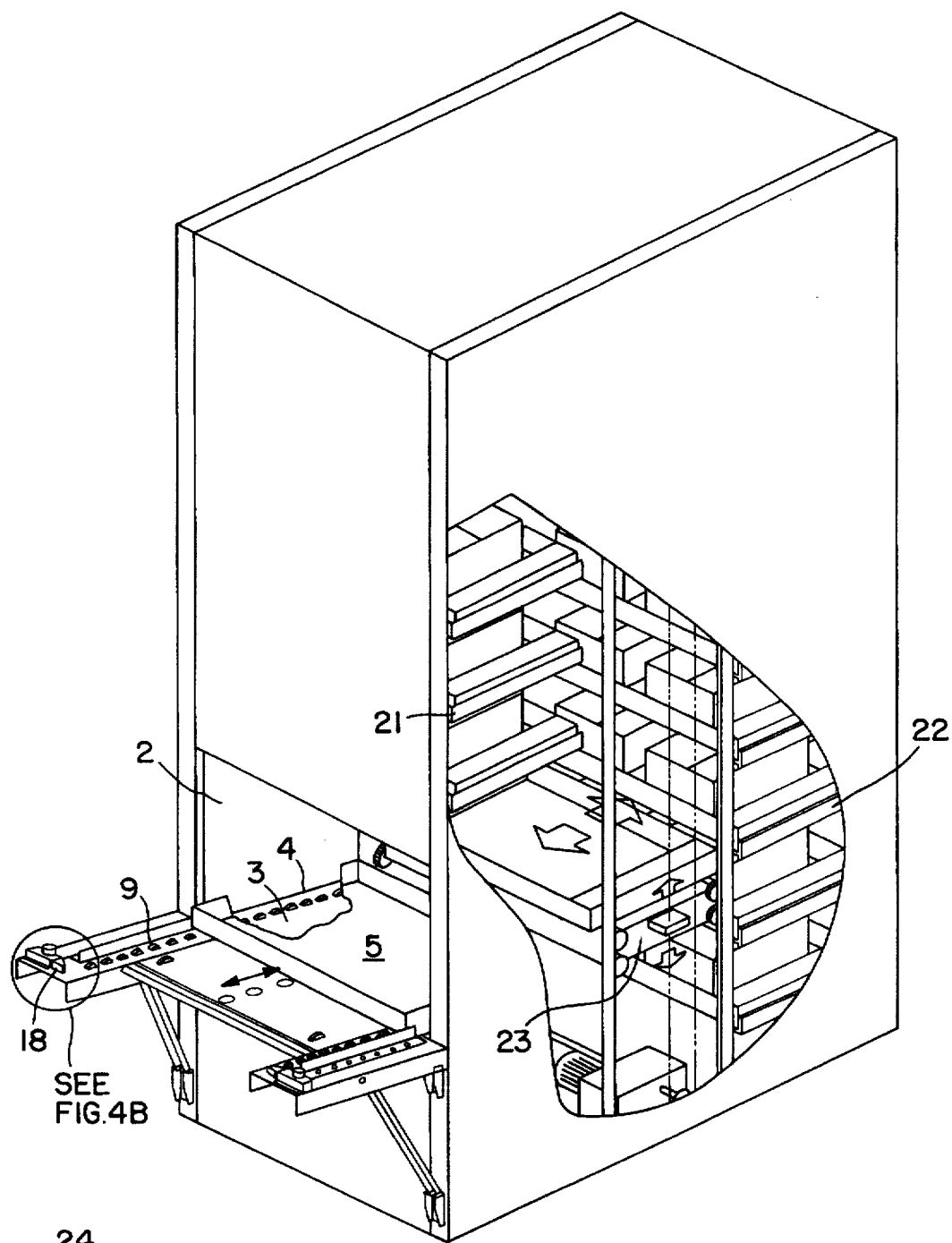
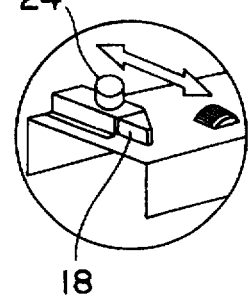
FIG. 4A
FIG. 4B

HIGH-RISE SHELVING

BACKGROUND OF THE INVENTION

The invention relates to high-rise shelving having two shelving columns exhibiting compartments disposed one above the other, and at least one shelving column is provided with a feed or removal opening. A vertical conveyor is disposed between the shelving columns and forms a unit with them and includes a horizontal conveying mechanism by means of which a shelf-rack can respectively be transferred from the region of the feed or removal opening into a compartment selected by the vertical conveyor or, can be removed from a compartment. The shelf-rack, following return guidance into the region of the feed or removal opening, can be conveyed by the vertical conveyor, from its platform, into the region of the feed or removal opening. The shelf-rack is supported, in the region of the feed or removal opening, by drivable rollers.

High-rise shelving of the above type is known from DE 42 33 688 A1. If, in the case of the known high-rise shelving, changes are to be made in quantity to the loading stock located on the shelf-rack, then the shelf-rack, for the purpose of loading or removal of objects, is transferred temporarily into the region of the feed or removal opening. The front edge of the base of the feed or removal opening, which base forms a platform for the respective shelf-rack, is aligned with the front wall of the high-rise shelving. Therefore, manipulations necessary for loading or unloading objects have to be carried out inside the feed or removal opening, which is configured in the style of a horizontal shaft. This is a factor which creates problems where the loaded objects are heavy and where the use of aids, such as jacks proves to be desirable. In practice, in such cases, a fixed table is arranged in front of the feed or removal opening. The fixed table, which, like the base of the feed or removal opening, has roller tracks, and a respective shelf-rack can temporarily be transferred onto the table. A table of this type, on the other hand, whenever the loading stock can be easily handled without aids, is not only superfluous, but even causes a nuisance.

SUMMARY OF THE INVENTION

The object of the invention is to design imported high-rise shelving of the type such that it can in each case be optimally operated in a manner conforming to the weight of the objects to be loaded. This object is achieved according to the invention by virtue of the fact that a collapsible table is disposed in front of the feed or removal opening of high-rise shelving, and that the drive of the rollers is interrupted in the folded-down table setting, but can be switched on in the folded-up table setting.

The high-rise shelving according to the invention offers the advantage that it can be rapidly and comfortably adapted to different loading stock circumstances. Moreover, it provides, a high degree of operating reliability, since the table is used not only as a storage surface, but additionally as an actuating member for a switch for interrupting the feed circuit to the drive of the rollers which are embedded in the base of the feed or removal opening.

BRIEF DESCRIPTION OF THE DRAWINGS

A particularly suitable embodiment of the invention is explained in greater detail below with reference to the appended drawing, in which:

FIG. 4A is a perspective view illustrating the structure of FIG. 1 in accordance with the present invention arranged in its operational relationship with a known shelving device.

DESCRIPTION OF THE BEST MODES FOR CARRYING OUT THE INVENTION

Figure 1:
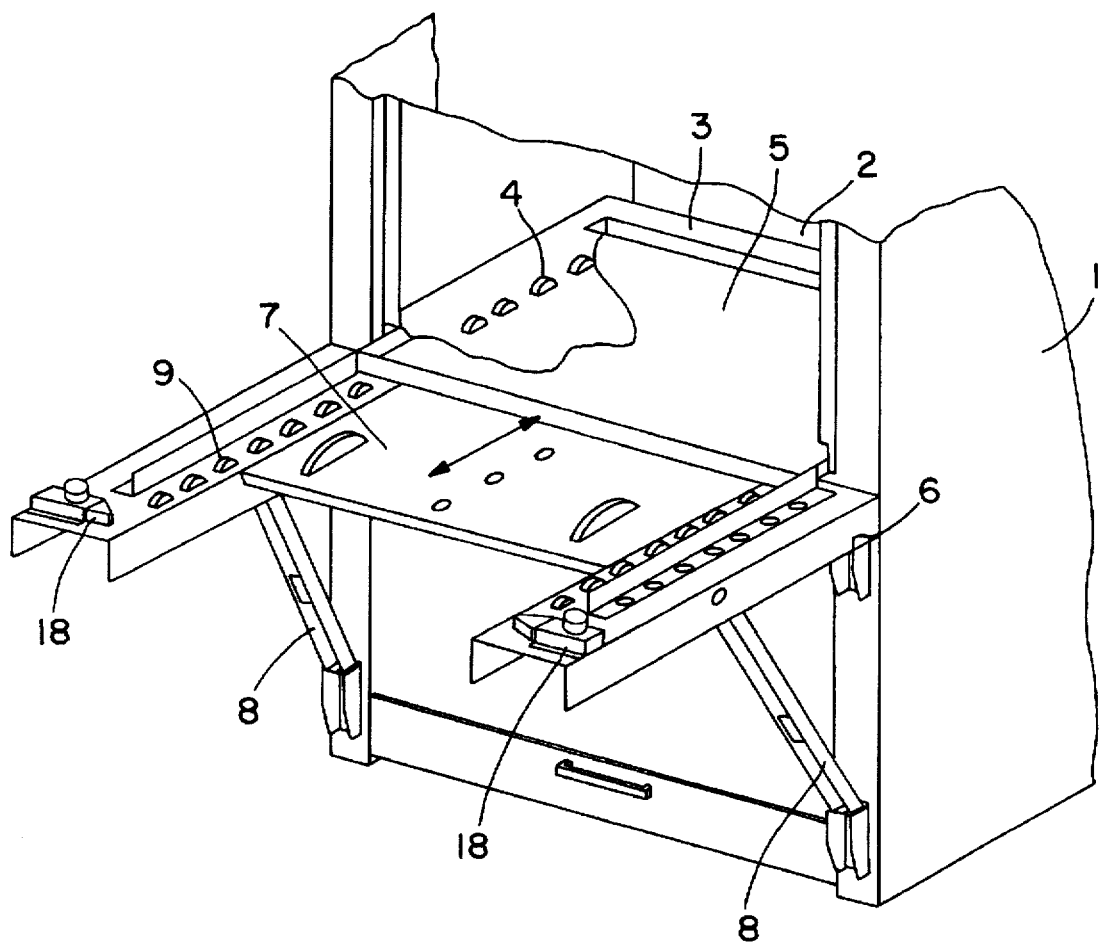
FIG. 1 shows the perspective part-view of high-rise shelving.

In FIG. 1, reference numeral 1 designates the housing of the high-rise shelving, on the front side of which there is located a feed or removal opening 2, whose base 3, which forms a platform, is provided with two mutually distanced roller tracks having drivable rollers 4. The rollers 4 support one of the shelf-racks 5, which can be loaded into the compartments of the shelving columns of the high-rise shelving. A table 7, which is supported in its working position by struts 8, is mounted pivotably on axles 6 on the front wall of the shelving. The table is likewise provided with roller tracks, the rollers 9 of which form extensions of the roller tracks formed by the rollers 4.

Figure 2:
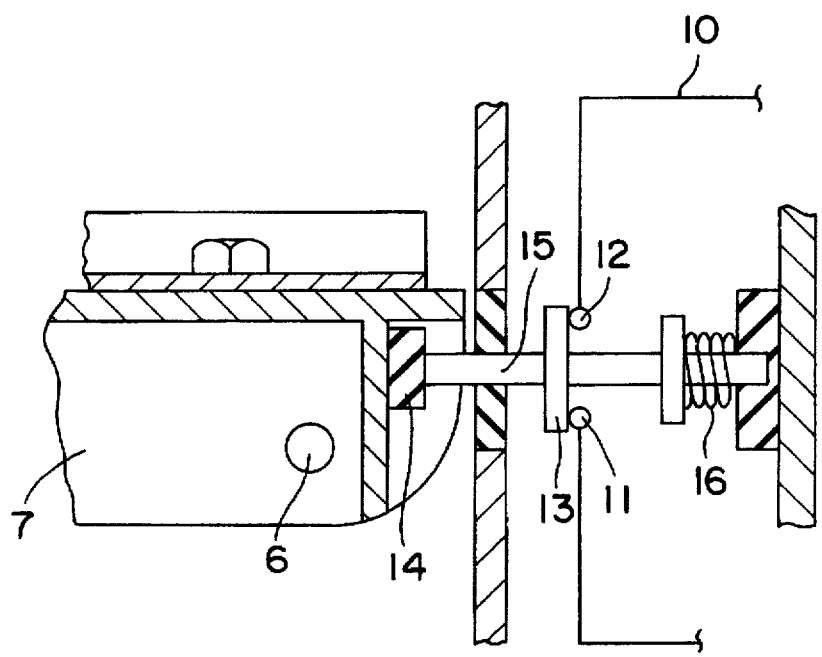
FIG. 2 shows parts of a switching circuit closed by the folded-up table of the high-rise shelving.
Figure 3:
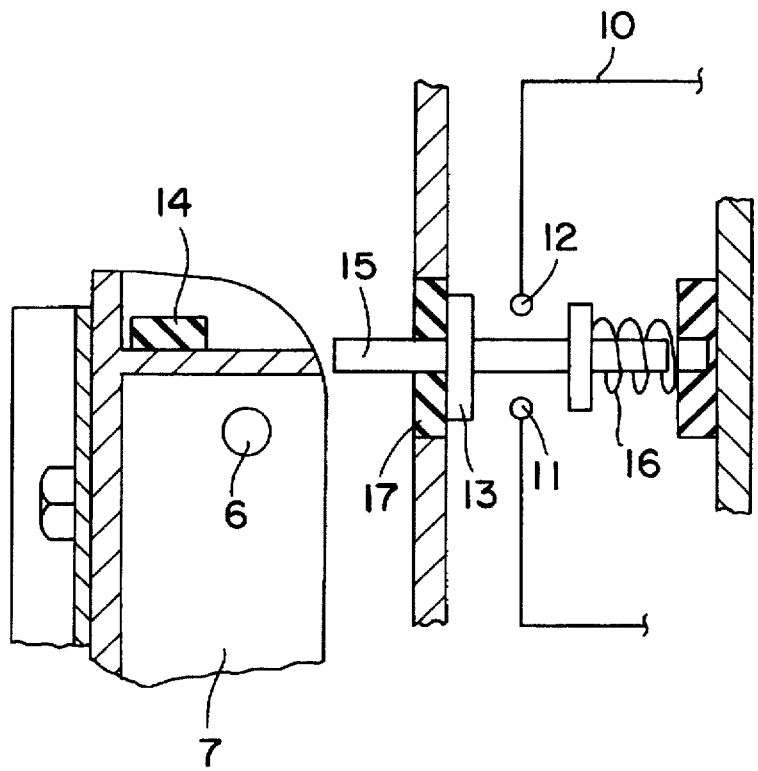
FIG. 3 shows the parts represented in FIG. 2, when the table is folded down.

In order to transfer the shelf-rack 5 from the feed or removal opening 2 onto the table 7, the rollers are set in motion by a conventional drive system (not shown). The feed circuit 10 of the drive system has a switch having two contacts 11 and 12, which are bridgeable by a contact bridge 13 actuatable by the table 7, as is illustrated in FIG. 2. The table 7 is equipped for this purpose with a pressure piece 14 made from insulating material, which, in the folded-up state of the table 7, moves a ram 15 counter to the action of a spring 16 so as to bring the contact bridge 13 into engagement with the contacts 11 and 12. The spring 16, in the folded-down state of the table 7, forces the contact bridge 13 against a supporting plate 17 made from insulating material, while interrupting the feed circuit 10 (cf. FIG. 3).

At that end of the table 7 facing away from the feed and removal opening 2, the table is equipped with releasable stops 18 for a shelf-rack 5 which has been transferred to it.

FIGS. 4A and 4B illustrates the high-rise shelving in accordance with the present invention in its operational relationship with a known shelving device, as for example the device disclosed in DE 42 33 688 A1, discussed previously herein. Corresponding elements of FIGS. 1–3 have been designated with the same reference numerals. Reference numerals 21 and 22 illustrate two shelving columns between which a vertical conveyor 23 is movable up and down. The vertical conveyor 23 can be brought into a position in which its platform is in alignment with the platform or base 3 of the feed and removal opening tube. When this position is reached, a horizontal conveying mechanism of the vertical conveyor 23 moves a shelf-rack in a direction dependent on the direction of the movement of the transportation mechanism. Reference numeral 18 illustrates a releasable stop (also see FIG. 1) having a handle 24 for releasing a resilient force applied to the stop 18 when the stop is in a locked position.

FIG. 4B illustrates a more detailed view of a designated portion of the high-rise shelving illustrated by FIG. 4A.

I claim:

1. High-rise shelving having two shelving columns exhibiting compartments disposed one above the other, of which at least one shelving column is provided with a feed and removal opening, and between shelving columns there is disposed a vertical conveyor comprising a horizontal conveying mechanism and forming a platform for shelf-racks to be stored in the compartments; said vertical conveyor forming a unit with said shelving columns and serving in connection with the horizontal conveying mechanism to transfer each of said shelf-racks from the region of the feed and removal opening into a compartment selected by the vertical conveyor, or, instead to transfer said shelf-rack from a compartment and into the region of the feed and removal opening; wherein driveable rollers are provided for supporting a shelf-rack in the region of the feed and removal opening; and in front of the feed and removal opening (2), a collapsible table (7) is attached to the shelving; said table (7) being movable from a first folded-up horizontal operating position, in which it forms a supporting surface being in alignment with the supporting surface formed by the drivable rollers of the feed and removal opening, and into a second folded-down vertical non-operational position, in which it opens free access to the feed and removal opening, and wherein the drive of the rollers (4) is interrupted in the folded-down position of the table, but can be switched on in the folded-up position of the table.

2. The high-rise shelving as claimed in claim 1, wherein the table (7) is equipped with releasable stops (18) for the shelf-rack (5).

* * * * *

UNITED STATES PATENT AND TRADEMARK OFFICE
CERTIFICATE OF CORRECTION

PATENT NO. : 5,687,858
DATED : November 18, 1997
INVENTOR(S) : Norbert Bouche

It is certified that error appears in the above-identified patent and that said Letters Patent is hereby corrected as shown below:

Column 1, Line 45: Delete "imported", and substitute --improved- -.

Column 2, Line 9: Delete ".", and substitute - -, and- -.

Column 2, Line 10: Add - -FIG. 4B illustrates a more detailed view of a designated portion of the high-rise shelving illustrated by FIG. 4A.- -

Column 2: Delete Lines 61 - 62 in its entirety.

Signed and Sealed this

Twentieth Day of January, 1998

Attest:

BRUCE LEHMAN

Attesting Officer

Commissioner of Patents and Trademarks